Figure 1:
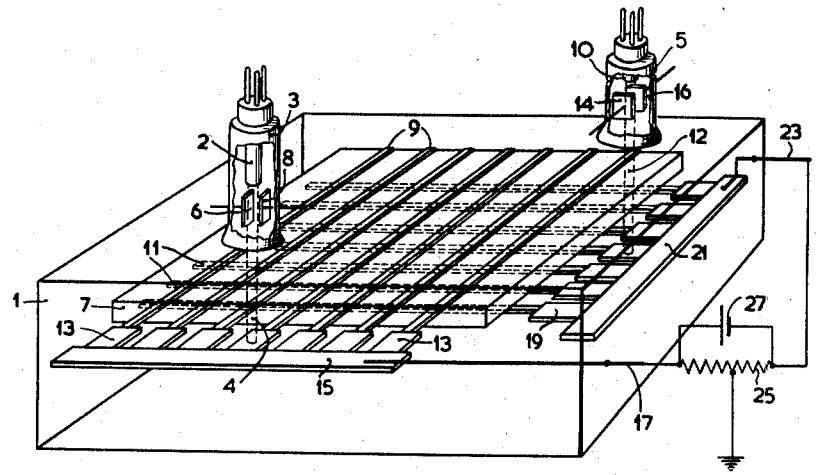

Jan. 10, 1961  E. F. DE HAAN  2,967,972

ELECTRON DISPLAY DEVICE

Filed March 17, 1958

INVENTOR
EDWARD FOKKO DE HAAN

BY
AGENT

United States Patent Office 2,967,972
Patented Jan. 10, 1961

2,967,972

ELECTRON DISPLAY DEVICE

Edward Fokko de Haan, Eindhoven, Netherlands, assignor to North American Philips Company, Inc., New York, N.Y., a corporation of Delaware Filed Mar. 17, 1958, Ser. No. 721,705

Claims priority, application Netherlands Apr. 2, 1957

9 Claims. (Cl. 315—13)

The present invention relates to electric discharge tubes comprising a viewing or display screen, discrete points of which can be made to emit light.

For image-reproduction, for example in television, radar, facsimile, oscillography or the like, use is nowadays commonly made of cathode-ray tubes in which a concentrated electron beam is incident on a luminescent screen and produces light. By deflecting the electron beam in two directions, usually at right angles to each other, any one point of the area of image can be reached.

This mode of building up the image suffers from a disadvantage in that stringent requirements are imposed on the geometrical construction of the electron gun producing the concentrated electron beam, in order to form a sharply defined bright luminous dot which, on sweeping over the viewing screen, does not vary in form and in luminous intensity so long as there does not occur intensity modulation of the current in the beam. In the case of electro-magnetic deflection great care is further to be exercised in avoiding astigmatism. One of the major inconveniences is, however, that large images require the use of a discharge tube of considerable length, which results in greatly increasing the weight of the tube and impeding its housing in cabinet.

In order to obviate the aforesaid inconveniences it has been proposed to waive the possibility of making any point of the viewing screen light up. According to this proposal a viewing screen is made up of an electro-luminescent layer having secured to it a large number of parallel electrodes at both sides so that the electrodes at one side cross approximately at right angles the electrodes at the other side. When establishing a given potential difference between an electrode on one side and an electrode on the other side, a luminous phenomenon occurs in the electro-luminescent layer only at the crossing of the two electrodes. The viewing screen thus made up need not be housed in an evacuated envelope.

For producing a given image, for example a television image, it is necessary for all of the discrete points of the area of image to flash successively. To this end, all the electrodes on one side have been connected through electric conductors to a series of contacts which can be connected sequentially to a source of potential by means of a rotary arm.

As is known, the building up of a detailed image, for example a television image, requires a considerable number of luminous dots in the area of image. Dependent upon the desired definition of the image the number of dots is chosen between $16 \times 10^4$ and $64 \times 10^4$. When using the known viewing screen so far described, this means that 400 to 800 electrodes must be provided on each side, which require 400 to 800 supply conductors that are to be connected to the contacts of the contact bank over which the contact arm has to pass at a high speed in order to realize continuity of motion and brightness on the viewing screen.

The large number of contacts and supply conductors and the high speed of commutation makes it well-nigh impossible to effect such commutation mechanically.

The present invention has for its object to effect this commutation electronically and for this purpose the viewing screen is disposed within an electric discharge tube.

An electric discharge tube according to the invention comprises a viewing screen consisting of a layer of electro-luminescent material sandwiched between two gratings each comprising a number of separate, non-intersecting, elongated electrodes, each electrode on one side of this screen crossing all the electrodes on its other side. The tube further comprises two electron guns for producing a first and a second concentrated electron beam co-acting with a first and a second deflection system respectively, the tube having the feature that one end of each electrode on one side of the electro-luminescent layer is connected through a strip of material whose resistance varies when exposed to electro-magnetic or corpuscular radiation to a first common electrode, and one end of each electrode on the other side of the electro-luminescent layer is connected through strips of material whose resistance varies when exposed to electro-magnetic or corpuscular radiation to a second common electrode, the two electron guns being oriented so that the first electron beam successively scans the strips of material whose resistance is subject to variation associated with the first common electrode, and the second electron beam successively scans the strips of material whose resistance is subject to variation associated with the second common electrode.

Materials whose resistance is subject to variation due to incident electro-magnetic or corpuscular radiation are, for example, cadmium sulfide, zinc-cadmium sulfide and lead oxide.

In a tube according to the invention, resistance variations can be produced by causing the electron beams to impinge directly upon the strips connected to the several electrodes or by first translating the energy of the electrons into electro-magnetic radiation, for example light, and by producing the resistance-variation with the aid of said radiation. For this purpose a luminescent screen may be disposed between the strips of material, the resistance of which is subject to variation, and the electron guns. The radiation generated by an electron beam at a given point of this screen is incident upon a given strip of material, the resistance of which is subject to variation.

The operation of an electric discharge tube according to the invention is comparable to that of the aforesaid known device, on the understanding that a given electrode is connected into the circuit by reducing, with the aid of an electron beam, the resistance of the strip associated with said given electrode, which results in transmitting the voltage from the common electrode to said given electrode. Since this is effected with the help of electron beams the viewing screen must naturally be housed in an electric discharge tube.

A discharge tube according to the invention and a device comprising it has inter alia the following advantages.

The luminous dots are no longer determined by the incidence of an electron beam on a luminescent screen, but exclusively by the crossing of two electrodes, hence these dots will invariably have the same form and size. The electron beams of the two guns merely constitute an expedient to determine which of the electrodes shall be connected into circuit. Hence the sole thing that matters is to convey in these beams a number of electrons sufficient to occasion the desired decreased resistance. Thus, for example, tape-shaped electron beams may be substituted for electron beams of circular cross-sectional area. This has the advantage that more electrons can be conveyed. A further advantage is that the electron beams need be deflected in only one direction, so that intricate deflection systems are no longer necessary. A major advantage is, however, that the discharge tube according to the invention may have a size much smaller than that of hitherto known tubes. This results in part from the fact that no stringent requirements need be imposed on the form of the point of impact and the mode of deflection of the electron beams and in part from the general geometrical set-up. As regards the first two points it is known that, if no stringent requirements need be imposed, the length of the electron beam from the point of impact on an electrode to the cathode may be short. If the direction of the electron guns is normal to the surface of the gratings, the three dimensions of the discharge tube according to the invention are substantially determined by the length and the width of the image to be built up and by the length of the electron guns.

A particularly suitable form of a discharge tube according to the invention has a still smaller dimension in a direction normal to the viewing screen, since it is possible for the direction of the electron beams and consequently of the electron guns to be parallel to the viewing screen, thus obtaining a flat box-shaped discharge tube which it is easy to house in an apparatus of small depth. In this form it is even possible to make the two electron beams pass in front of the gratings.

Similarly as in the aforesaid known device, it is possible for the electrodes of one or both gratings to extend parallel to one another, the electrodes on one side then crossing the electrodes on the other side, preferably at right angles.

It is not necessary to connect each end of an electrode of a grating through a separate strip of material, the resistance of which is subject to variation, to the common electrode. In a particular form of the invention it has proved possible to connect the electrodes of one grating to a single strip of material, the resistance of which is subject to variation, and to connect this common strip, throughout its length, electrically to the common electrode.

In a particularly simple form of the electro-luminescent layer, the electrodes of the two grids are covered all around or on one side with the electro-luminescent material and the two gratings are pressed together with their coated sides.

In order that the invention may be readily carried into effect, examples will now be described in detail with reference to the accompanying drawing, in which Fig. 1 is a perspective view of one form of a discharge tube according to the invention, in which the resistance variations are produced by electron beams of electron guns extending at right angles to the plane of the viewing screen.

Figure 2:
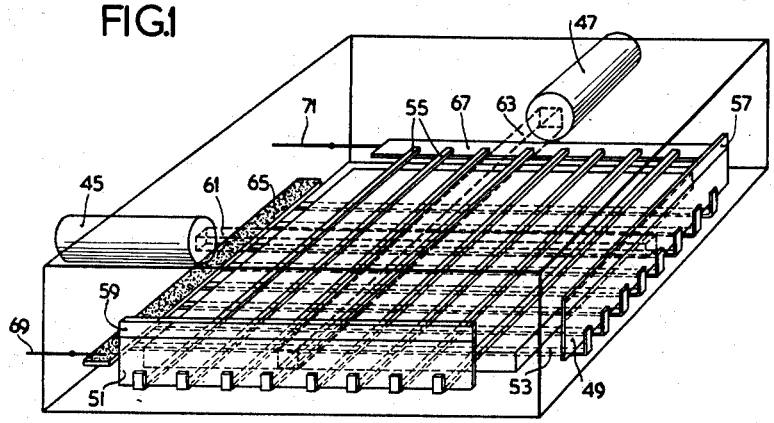
Figure 3:
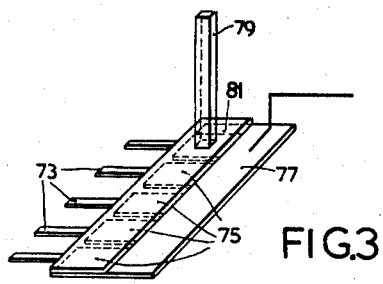

Fig. 2 shows a corresponding form in which the electron guns extend extending parallel to the area of image, and Fig. 3 is a fragmentary view of one form in which a luminescent screen is disposed between an electron gun and the strips of variable resistance.

In Fig. 1, the reference numeral 1 designates the glass wall of an electric discharge tube, which wall has two arms 3 and 5 each housing an electron gun. The discharge tube contains an electro-luminescent plate 7 furnished on one side with a number of parallel grid wires or conductors 9. On the other side provision is made of parallel grid wires or conductors 11 crossing the grid wires 9 at right angles. The grid wires 9 are connected at one end to strips 13 made from a material, the resistance of which is subject to variation under electron bombardment. The strips 13 are further connected to a first common electrode or terminal 15 having a supply conductor 17. The grid wires 11 are also connected at one end to strips 19 of a material, the resistance of which is subject to variation under electron-bombardment. The strips 19 are further connected to a second common electrode or terminal 21 having a supply conductor 23. The supply conductors 17 and 23 are connected to the ends of a centrally grounded potentiometer 25 via a source of potential 27.

The arm 3 contains an electron gun 2 shown schematically. This electron gun produces an electron beam 4 adapted to be swept back and forth over strips 13 by means of deflection plates 6 and 8. The arm 5 contains an electron gun 10 likewise shown schematically. This electron gun 10 produces an electron beam 12 adapted to be swept back and forth over strips 19 with the aid of deflection plates 14 and 16.

The discharge tube operates as follows:

If not struck by electrons, the strips 13 and 19 have a very high resistance. This resistance may appreciably exceed the leakage resistance of any of the grid electrodes relative to earth. If none of the strips 13 or 19 is struck by electrons, the potential of the grid electrodes on both sides of the plate 7 will substantially correspond to earth potential. When energizing the electron guns 2, 10 and applying varying voltages, for example saw-tooth voltages, to the deflection electrodes 6, 8 and 14, 16 respectively, with the result that the beams 4 and 12 respectively will successively scan the strips 13 and 19 respectively, the resistance of strips 13 and 19 struck respectively will decrease. The grid wire connected to the strip struck then attains a potential approaching that of the associated common electrode 15 or 21 and tending to equal it practically. This results in a potential difference at the crossing of these grid wires and in making the electro-luminescent plate 7 light up at this point. Since the resistance of the strips 13 and 19 not struck will not vary, no luminous phenomenon will occur at the crossings of the connected grid wires and the non-connected grid wires, if the voltage of the common electrodes 15 and 21 respectively relative to earth is not sufficient to cause the electro-luminescent plate 7 to light up. A luminous phenomenon is possible only at a crossing of two grid wires located one on each side of the electro-luminescent plate, the potential of one grid wire being increased, and that of the other grid wire being diminished relative to earth.

Naturally, the potentials may be considered with regard to another point of fixed potential, but the simplest way is to connect this point of fixed potential to earth, which is assumed to be the case above.

If the electron guns 2 and 10 respectively are provided with control grids, the beams 4 and 12 respectively can be intensity-modulated. The control may be such that one or two beams are completely suppressed at a given instant, thus producing on the luminescent plate 7 a pattern of flashing and non-flashing dots, the luminous intensity of all the luminous dots being the same. This may, for example, be true, if the tube is to be used for oscillography purpose. For reproducing television images and, say, facsimile transmission, gradation of the image is necessary. This is possible by modulating one or both electron beams for less than 100%. The resistance variation of the strips 13 and 19 depends upon the number of electrons impinging on them, hence upon the voltage applied to the control grid of the gun concerned.

Fig. 2 shows a form substantially corresponding to that shown in Fig. 1. In Fig. 2, however, the electron guns are housed in tubes 45 and 47 respectively, substantially parallel to the viewing screen. The strips of resistance material designated by 13 and 19 respectively in Fig. 1, are united to form common strips 49 and 51 respectively. As may be seen from Fig. 2, these strips 49 and 51 extend at right angles to the direction of the grid wires here designated by 53 and 55 respectively. The strips 49 and 51 respectively are throughout their length in electrical contact with the first and the second common electrode 57 and 59 respectively. Similarly to the Fig. 1 embodiment, the common electrodes 57 and 59 are connected to a voltage source for applying a high and a low potential, respectively, thereto. This arrangement permits scanning with the aid of two ribbon-shaped electron beams 61 and 63 parallel to the area of image. Fig. 2 further shows how the grid wires on the side of the electron guns are connected to resistive strips 65 and 67 respectively provided on one side with a conductive surface layer and supply conductors 69 and 71 respectively. These supply conductors 69 and 71 may be grounded to dissipate any accumulated charges on the grid wires. The resistance between each grid wire and the supply conductors 69 and 71 respectively is made lower than the resistance of the strip connected to the other end of the grid wire, when not struck by electrons.

The use of said resistive strips in this tube eliminates the dependency upon the leakage resistance of each grid wire, which makes the operation often more reliable.

Fig. 3 is a fragmentary view of a tube according to the invention, which is essentially not different from a tube as shown in Fig. 2. The reference numeral 73 denotes a number of grating electrodes connected through strips 75, the resistance of which is subject to variation when exposed to light, to a common electrode 77. The reference numeral 79 denotes a tape-shaped electron beam. This beam 79 does not fall upon the strips 75, as in Fig. 2, but upon a luminescent screen 81 over the strips 75. In the screen 81, the electron energy is translated into light producing the resistance variation of the strips 75. If desired, any strip 75 may be provided with a separate luminescent layer.

When using discharge tubes according to the invention for television purposes it will be appreciated that either positive or negative modulation of incoming signals is possible.

The electroluminescent plate 7 may e.g. consist of electroluminescent zinc sulphide activated with copper and a synthetic resin, such as ureaformaldehyde, as a binder.

What is claimed is:

1. A display device comprising an electro-luminescent body, a pair of grid-like electrodes each comprising plural non-intersecting elongated conductors and each located on one side of said electro-luminescent body and both defining a plurality of conductor crossings at which the intervening portion of the electro-luminescent body can be caused to luminesce when the potential of a conductor of one electrode is raised and the potential of a conductor of the other electrode is lowered, first and second common electrical terminals, a radiation-responsive, variable-resistive element coupling each conductor of said one electrode to the first common terminal, and coupling each conductor of the other electrode to the second common terminal, first and second electron guns for producing a pair of electron beams, first deflection means for causing the beam from the first gun to become successively coupled to the variable-resistive elements coupled to the conductors of the said one electrode, and second deflection means for causing the beam from the second gun to become successively coupled to the variable-resistive elements coupled to the conductors of the other electrode, whereby coupling of the beam to a variable-resistive element sharply reduces its resistance and effectively connects the associated conductor to the associated common terminal.

2. A device as set forth in claim 1 wherein a radiation-producing phosphor is interposed between the electron guns and the variable-resistive elements, and the deflection means cause the electron beams to scan the phosphor, the radiations produced thereby in turn actuating the associated variable-resistive elements.

3. A display device comprising a layer of electro-luminescent material, a pair of grid-like electrodes each comprising plural parallel elongated conductors and each contacting opposite sides of said electro-luminescent layer and both defining a plurality of conductor crossings at which the intervening portion of the electro-luminescent layer can be caused to luminesce when the potential of a conductor of one electrode is raised and the potential of a conductor of the other electrode is lowered, first and second common electrical terminals, an electron-responsive, variable-resistive element coupling each conductor of said one electrode to the first common terminal, and coupling each conductor of the other electrode to the second common terminal, first and second electron guns for producing a pair of electron beams, first deflection means for causing the beam from the first gun to scan the variable-resistive elements coupled to the conductors of the said one electrode, and second deflection means for causing the beam from the second gun to scan the variable-resistive elements coupled to the conductors of the other electrode, whereby the scanned variable-resistive element becomes conductive and connects the associated conductor to the associated common terminal.

4. A device as set forth in claim 3 wherein means are provided for maintaining the first terminal at a high potential and the second terminal at a low potential.

5. A device as set forth in claim 4 wherein the variable-resistive elements coupling the conductors of one grid to a common terminal are combined to form a single strip of variable-resistive material, one side of which is connected to the conductors, and the other side of which is connected to the common terminal.

6. A device as set forth in claim 4 wherein fixed-resistive elements, whose resistance is smaller than the unscanned variable-resistive elements, couple together the conductors of an electrode and a common supply conductor.

7. A device as set forth in claim 6 wherein the fixed-resistive elements are combined to form a single resistive strip.

8. A display device comprising a planar layer of electro-luminescent material, a pair of grid-like electrodes each comprising plural parallel elongated conductors and each contacting opposite sides of said electro-luminescent layer and both defining a plurality of conductor crossings at which the intervening portion of the electro-luminescent layer can be caused to luminesce when the potential of a conductor of one electrode is raised and the potential of a conductor of the other electrode is lowered, first and second common terminals, an electron-responsive, variable-resistive element coupling each conductor of said one electrode to the first common terminal, and coupling each conductor of the other electrode to the second common terminal, first and second electron guns for producing a pair of electron beams travelling over the electrodes and generally parallel thereto, first deflection means for causing the beam from the first gun to scan the variable-resistive elements coupled to the conductors of the said one electrode, second deflection means for causing the beam from the second gun to scan the variable-resistive elements coupled to the conductors of the other electrode, and means for maintaining a high potential at the first terminal and low potential at the second terminal whereby the scanned resistive elements become conductive and transfer the potential at the associated terminal to the associated conductor.

9. A display device as set forth in claim 8 wherein the electron guns produce generally rectangular-shaped beams.

References Cited in the file of this patent

UNITED STATES PATENTS

| | | |
|---|---|---|
| 1,754,491 | Wald | Apr. 15, 1930 |
| 1,779,748 | Nicolson | Oct. 28, 1930 |
| 2,527,652 | Pierce | Oct. 31, 1950 |
| 2,543,793 | Marks | Mar. 6, 1951 |
| 2,558,019 | Toulon | June 26, 1951 |
| 2,698,915 | Piper | Jan. 4, 1955 |
| 2,861,206 | Fiore | Nov. 18, 1958 |
| 2,869,111 | Young | Jan. 13, 1959 |
| 2,877,371 | Orthuber | Mar. 10, 1959 |
| 2,877,376 | Orthuber | Mar. 10, 1959 |

UNITED STATES PATENT OFFICE
CERTIFICATE OF CORRECTION

Patent No. 2,967,972 January 10, 1961

Edward Fokko de Haan

It is hereby certified that error appears in the above numbered patent requiring correction and that the said Letters Patent should read as corrected below.

Column 3, line 52, strike out "extending".

Signed and sealed this 19th day of September 1961.

(SEAL)
Attest:

ERNEST W. SWIDER
Attesting Officer

DAVID L. LADD
Commissioner of Patents
USCOMM-DC

UNITED STATES PATENT OFFICE
CERTIFICATE OF CORRECTION

Patent No. 2,967,972

January 10, 1961

Edward Fokko de Haan

It is hereby certified that error appears in the above numbered patent requiring correction and that the said Letters Patent should read as corrected below.

Column 3, line 52, strike out "extending".

Signed and sealed this 19th day of September 1961.

(SEAL)
Attest:

ERNEST W. SWIDER
Attesting Officer

DAVID L. LADD
Commissioner of Patents

USCOMM-DC